(12) United States Patent
Lichtinger

(10) Patent No.: US 6,280,174 B1
(45) Date of Patent: Aug. 28, 2001

(54) MOLDING APPARATUS HAVING AN IMPROVED FASTENING MEANS OF THE PERIPHERAL DIES TO THE CORE

(75) Inventor: Peter Lichtinger, Fürstenfeldbruck (DE)

(73) Assignee: Krauss-Maffei Kunststofftechnik GmbH (*) Notice: Subject to any disclaimer, the term of this patent is extended or adjusted under 35 U.S.C. 154(b) by 0 days.

(21) Appl. No.: 09/434,879

(22) Filed: Nov. 5, 1999

Related U.S. Application Data

(63) Continuation of application No. PCT/EP99/01269, filed on Feb. 26, 1999.

(30) Foreign Application Priority Data

Mar. 6, 1998 (DE) .............................. 198 09 720

(51) Int. Cl.⁷ .............................. B29C 33/00; B29C 33/22
(52) U.S. Cl. .................. 425/437; 425/450.1; 425/451.9; 425/577
(58) Field of Search .................................... 425/437, 567, 425/577, 450.1, 451.2, 451.9, 590, 591, DIG. 102

(56) References Cited

U.S. PATENT DOCUMENTS

| | | | |
|---|---|---|---|
| 4,235,576 | * 11/1980 | Robinson | 425/138 |
| 4,402,659 | 9/1983 | Greenbaum . | |
| 4,460,326 | * 7/1984 | Croseck et al. | 425/411 |
| 4,645,447 | * 2/1987 | Sumitomo | 425/450.1 |
| 4,707,321 | 11/1987 | Segawa et al. . | |
| 5,040,962 | * 8/1991 | Waszeciak et al. | 425/112 |
| 5,364,253 | * 11/1994 | Kojima et al. | 425/78 |
| 5,766,407 | * 6/1998 | Miwa et al. | 156/382 |

FOREIGN PATENT DOCUMENTS

| | | |
|---|---|---|
| 33 15 746 A | 11/1983 | (DE) . |
| 38 20 232 A | 12/1988 | (DE) . |
| 06 344365 A | 12/1994 | (JP) . |

OTHER PUBLICATIONS

Patent Abstracts of Japan, vol. 096, No. 007, Jul. 31, 1996 & JP 08 057922 A (Komatsu Ltd.), Mar. 5, 1996.

* cited by examiner

Primary Examiner—Nam Nguyen
Assistant Examiner—Emmanuel Luk
(74) Attorney, Agent, or Firm—Henry M. Feiereisen

(57) ABSTRACT

A molding apparatus includes a core (3) and a female mold member (4) as well as wraparound peripheral dies (7), which are attached to the core for movement in a closing direction and completely surround the core (3). In the region of the impact areas of the peripheral dies (7) upon the female mold member (4), the impacting surfaces are configured complementary, for example planar. Each peripheral die (7) is attached laterally to the core by at least one spacer and retaining element (8, 10), with the spacer element (8) having a width which is slightly greater than a cross section of the peripheral die, so that a small gap (9) is formed between confronting surfaces of the peripheral dies and the core. The fixed tolerance gap offers the advantage that constant, minimum frictional conditions exist. The lateral attachment facilitates the replacement of individual peripheral dies (7) and temperature-based dimensional changes of the core (3) are followed by the peripheral dies, without risk of jamming.

14 Claims, 4 Drawing Sheets

MOLDING APPARATUS HAVING AN IMPROVED FASTENING MEANS OF THE PERIPHERAL DIES TO THE CORE

CROSS-REFERENCES TO RELATED APPLICATIONS

This application is a continuation of prior filed copending PCT International application no. PCT/EP99/01269, filed Feb. 26, 1999.

BACKGROUND OF THE INVENTION

The present invention relates, in general, to a molding apparatus, and especially, but not exclusively, to a molding apparatus for the manufacture of plastic panes, for example, window panes for passenger cars.

Molding apparatuses, involved here, include a core and a female mold member as well as circumferential peripheral dies, with the peripheral dies being attached to the core for movement in closing direction. The core is completely surrounded by the peripheral dies, with the female mold member so configured in the region of the impact areas of the peripheral dies as to complement these impact areas.

FIG. 1 shows a cross sectional illustration of a conventional molding apparatus of this type which includes a fixed mold clamping pate having attached thereon the female mold member and a movable mold clamping plate having attached thereon the core via a core plate. Upon movement of the movable clamping plate toward the fixed clamping plate, the core descends into the female mold member, whereby the movement of the core is guided by the circumferential peripheral dies which also realize a sealing of the cavity defined between the core and the female member. This conventional molding apparatus suffers the drawbacks that the descending peripheral dies are damaged on both mold halves (injection side and closing side) as a result of:

an imprecise centered descent of the core side into the female mold member;

too narrow dimensions of the female mold member as a consequence of mold shrinkage caused by temperature decrease below the very narrow temperature tolerances;

one-sided contact of the descending dies as a consequence of a floating effect which is encountered during compression injection molding and cannot be offset by greater machine tolerances;

excessive core dimension as a consequence of a mold dilatation caused by temperature deviation above the very narrow temperature tolerances.

Attempts were made to address these drawbacks by providing the core with one or more circumferential peripheral dies which are mounted to the core and movable in closing direction and which are able to bear upon flat areas of the female mold member in closed state. An example of such a mold is described in U.S. Pat. No. 4,707,321 for making optical data carriers. The mold has a circular core which is circumscribed by a circular peripheral die which can be moved by compressed air along the core in direction of the female mold member. The peripheral die is hereby formed in one piece in accordance with the diameter of the circular injection molded part. This peripheral die is unsuitable for use with differently designed injection molded parts.

"Patent Abstracts of Japan, Publication Number 08057922 A" discloses a molding apparatus with several peripheral dies which are wrapped around the core and are mounted to the core for movement in closing direction and completely surround the core. Each individual peripheral die is received in a T-shaped groove which is continuous around the entire circumference of the marginal region of the core and open toward the side of the female mold member and which is formed of two pieces in radial direction. In order to realize a close fit of each peripheral die in this groove, without jamming, but yet being shiftable along the core, both halves of each peripheral die are moved apart by spring elements so as to bear upon confronting inside surfaces of the groove. Provided in the bottom of the groove are spring elements by which the peripheral dies are retained in the direction of the female mold member under prestress. When the mold is closed, the peripheral die, jutting out from the groove, is pressed against the female mold member which has a flat configuration in the contact area of the peripheral die. This molding apparatus is complex, and a replacement of defective or worn-off peripheral dies is very cumbersome. A further drawback resides in the fact that the inner part of the peripheral die is pushed outwards when high injection pressures or compression forces are applied, so that plastic mass can escape and/or flashes are encountered on the injection molded part. Although this could conceivably be avoided by sufficiently biasing the bottom spring, this modification would be accompanied by the drawback that the peripheral die can be moved in the T-groove only at great difficulty or can even jam.

SUMMARY OF THE INVENTION

It is thus an object of the present invention to provide an improved molding apparatus, obviating the afore-stated drawbacks.

In particular, it is an object of the present invention to provide an improved molding apparatus which maintains the advantages of such conventional molds, shown in FIG. 1, but yet has a simpler configuration and allows in particular an easy replacement of individual peripheral dies.

These objects, and others which will become apparent hereinafter, are attained in accordance with the present invention by providing a female mold member; a core capable of moving in a closing direction against the female mold member to define a cavity for molding an object, with the core being completely surrounded by peripheral dies which are movable in the closing direction against a complementary impact area of the female mold member; and fasteners for securing each of the peripheral dies laterally to the core, with the fasteners including a retaining element for attaching the peripheral die to the core, and a spacer element fitted in the peripheral die and having a width which slightly exceeds a cross section of the peripheral die to thereby realize a gap between confronting surfaces of the core and the peripheral die.

An essential feature of a molding apparatus according to the present invention resides in the particular configuration of the securement of the peripheral dies to the core. The lateral attachment with spacer and retaining elements allows, on the one hand, a displacement of the peripheral dies along the core, and, on the other hand, the attachment and detachment of the peripheral dies to and from the core can be executed in a simpler manner. The fixed tolerance gap results in constant, minimum frictional conditions, thereby significantly enhancing the availability of the mold. A jamming of the peripheral dies upon the core is prevented even at comparably great temperature fluctuations, because the novel and inventive lateral attachment realizes that the peripheral dies simply "follow" temperature-based dimensional changes of the core.

A molding apparatus according to the present invention is also advantageous for the following reasons. The circumferential gap between the confronting surfaces of the peripheral dies and the core can be kept constant at less than 0.05 mm, preferably in the range of about 0.01 to 0.02 mm, irrespective of temperature fluctuations of the mold or intended temperature changes, irrespective of machine-guide tolerances, and irrespective of components and mold dimensions. In addition, the mold is available for a wide range of applications, and no flash removal or re-finishing operations of the edges of the plastic parts are necessary.

BRIEF DESCRIPTION OF THE DRAWING

The above and other objects, features and advantages of the present invention will now be described in more detail with reference to the accompanying drawing, in which.

DETAILED DESCRIPTION OF PREFERRED EMBODIMENTS

Figure 1:
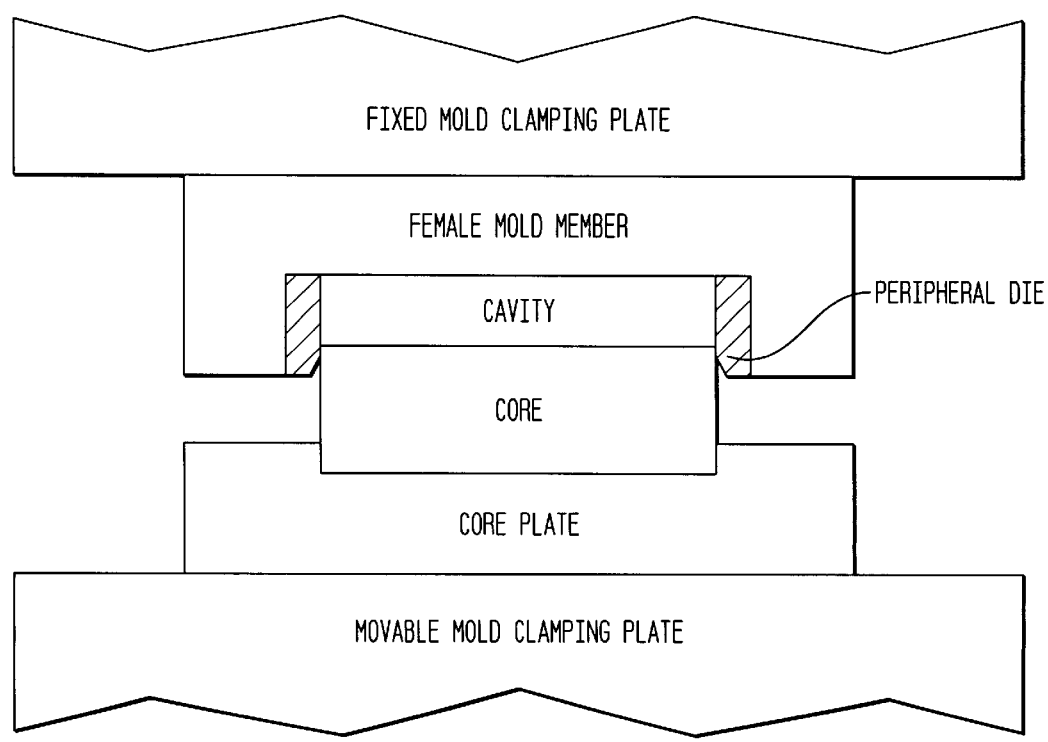
FIG. 1 is a schematic illustration of a conventional molding apparatus.

Throughout all the Figures, same or corresponding elements are generally indicated by same reference numerals.

The present invention relates, in general, to a molding apparatus, and especially, but not exclusively, to a molding apparatus for the manufacture of plastic panes, for example, window panes for passenger cars. The invention is, however, not limited thereto, but applicable in general to the manufacture of formed parts with a molding apparatus, e.g. a compression injection molding apparatus.

Figure 2:
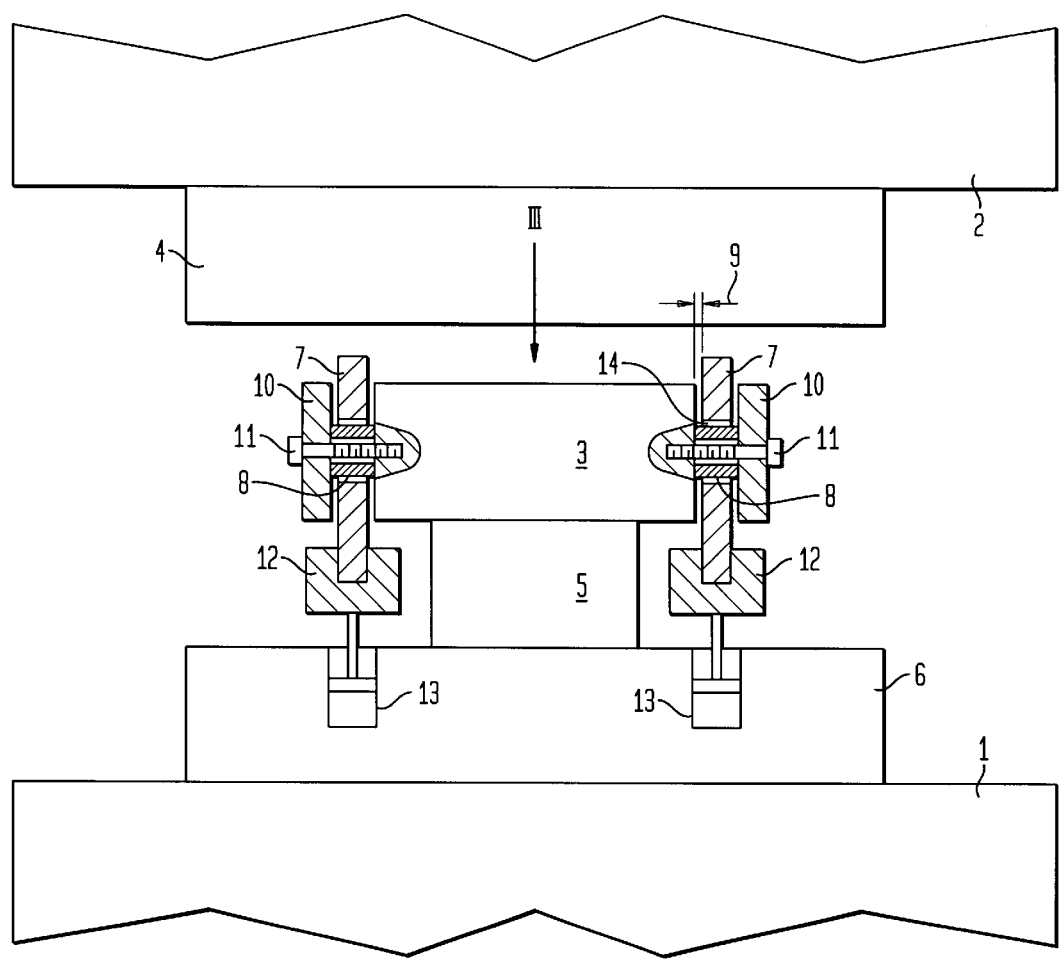
FIG. 2 is a cross sectional view of a molding apparatus according to the invention.
Figure 3:
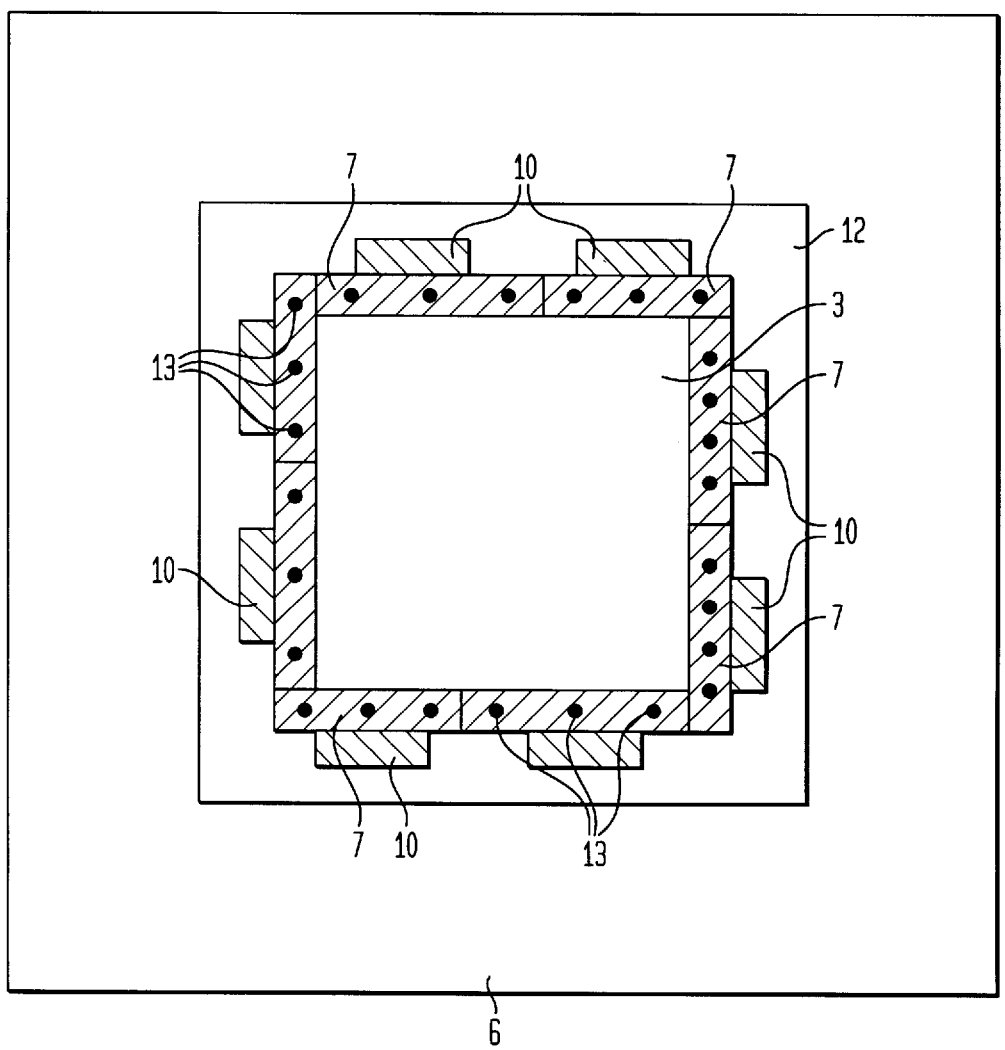
FIG. 3 is a sectional view of the molding apparatus, taken in the direction of arrow III in FIG. 2.

Turning now to the drawing, and in particular to FIG. 2, there is shown a cross sectional view of a molding apparatus according to the invention, including a core 3 and a female mold member 4 which are fastened onto a movable mold clamping plate 1 and a fixed mold clamping plate 2, respectively, for molding plastics. The core 3 is secured to the movable mold clamping plate 1 via a backing plate 5 and a core receiving plate 6. Displaceable continuously in a sealing manner about the core 3 are a plurality of circumferentially disposed peripheral dies 7, as best seen in FIG. 3. Each of the peripheral dies 7 is formed with a recess for placement of a spacer 8 in the form of a sleeve which has a width that slightly exceeds the cross section of the peripheral dies 7. Thus, a small gap 9 is formed which has a width of less than 0.05 mm, preferably in a range from 0.01 mm to 0.02 mm between confronting surfaces of the peripheral dies 7 and the core 3. The securement of each peripheral die 7 upon the core 3 is realized by a retaining element 10, e.g. of elongated configuration, which is tightly pressed against the spacer 8 through threaded engagement of a fastening screw 11 into the core 3. In this manner, a same gap dimension is maintained irrespective of a heat expansion or cold shrinkage. As the peripheral dies 7 are placed around the core 3 and displaceable relative thereto as the recess 14 exceeds a diameter of the spacer 8, the peripheral dies 7 do not engage into the opposing female mold member 4, so that a jamming or tilting is prevented, regardless of the temperature.

Optionally, the spacer element 8 and the retaining element 10 may be configured in one piece in the form of a T shaped sliding block, with the peripheral die 7 having a recess for engagement by the sliding block.

The peripheral dies 7 are mounted on a support frame 12 which extends continuously about the core 3, so that a heat expansion or a cold shrinkage of the core 3 results in a relative movement between the peripheral dies 7 and the support frame 12. In general, the normal tolerances upon threaded engagement of the peripheral dies 7 to the support frame 12 are sufficient so that no tolerance gap is shown in the Figures in this respect. The securement of the peripheral dies 7 to the support frame 12 is shown in more detail in FIG. 4 and is realized by a bore 15 in the support frame 12 for receiving a screw fastener 16. The bore 15 may, optionally, have a greater diameter beyond normal tolerances in order to permit a greater relative movement between the peripheral dies 7 and the support frame 12.

The peripheral dies 7 are displaceable by several piston-cylinder units 13 which are fitted in respected pockets of the core receiving plate 6 and act via a confronting surface of the support frame 12 on the peripheral dies 7 to position the peripheral dies 7 beyond the core 3 so that a cavity is formed when the core 3 is moved by the movable mold clamping plate 1 in the direction of the female mold member 4 and the peripheral dies 7 impact against the female mold member 4. When the core 3 is further moved toward the female mold member 4, the core 3 executes a compression stroke, while the piston-cylinder units 13 are relieved at the same time, thereby ensuring, on the one hand, that the pressure of the peripheral dies 7 upon the female mold member 4 does not become excessive, and, on the other hand, permitting application of a sufficient compression force. A sealing of the parting lines of the peripheral dies 7 upon the parting line of the female mold member 4 may also be realized, apart from the piston-cylinder units, by springs or wedges, with or without control for the parallel synchronous run.

The above-described process steps are only one example of innumerable ways by which the molding tool according to the present invention can be used to mold a product. For example, it is certainly possible to keep the molding tool at commencement completely closed so that the cavity is zero, i.e. the core rests against the female mold member while the peripheral dies are retracted and do not project beyond the core. Upon injection of plastic material, the movable mold clamping plate and thus the core are moved away from the female mold member while the peripheral dies are acted upon by the piston-cylinder units to remain in contact with the female mold member.

Persons skilled in the art will understand that the piston-cylinder units 13 may also be so configured as to directly act upon the peripheral dies 7. The piston-cylinder units 13 may be operated hydraulically or pneumatically, or may be replaced by electromechanically driven spindles. Although not shown in the drawing, spring members, for example annular springs, may be positioned at a core-proximal side of the peripheral dies 7 for biasing the peripheral dies 7 in the direction of the female mold member 4.

The plan view of FIG. 3 shows the wraparound disposition of the peripheral dies 7 with respect to the core 3. Each peripheral die 7 requires at least one retaining element 10. The spacer sleeves and the fastening screws are not shown in FIG. 3 for sake of simplicity. Suitably, each peripheral die 7 is acted upon from below by three or four piston-cylinder units 13, so as to realize a precise movement of the peripheral dies 7 and to permit, if necessary, a separate adjustment of the contact pressure for each peripheral die 7. Through skilled arrangement of the peripheral dies 7, as shown by way of example in FIG. 3 for a square molded part, the peripheral dies 7 are able to shift relative to one another, e.g., at influence of temperature, without adversely affecting the seal of the cavity. In the embodiment, involved here, the peripheral dies 7 may expand at each edge beyond the edge.

Figure 4:
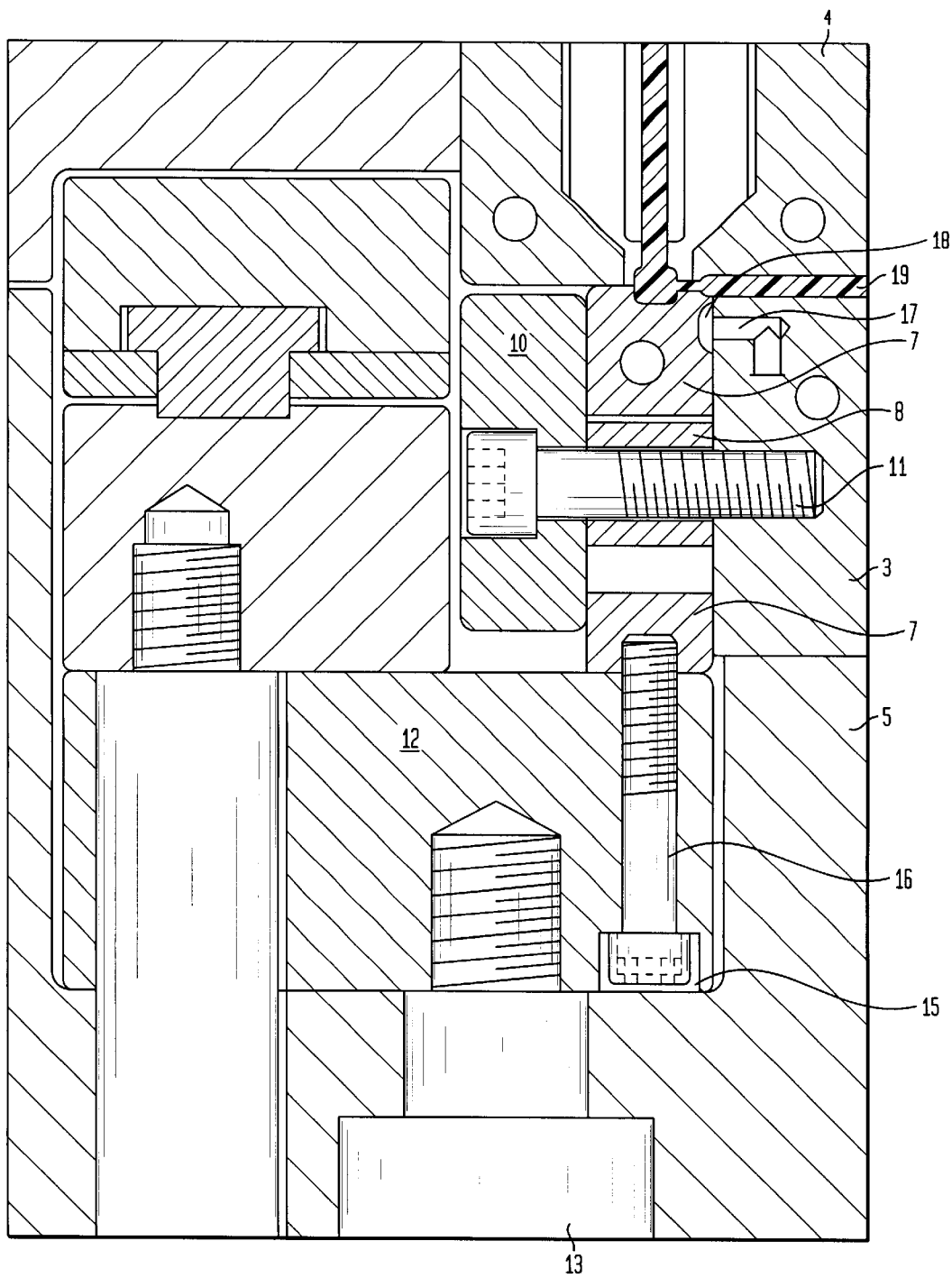
FIG. 4 is a sectional cutaway view, on an enlarged scale, of the molding apparatus of FIG. 2, showing in detail the attachment of a peripheral die to the core.

FIG. 4 shows a cross sectional view, on an enlarged scale, of one side of the mold, showing in detail the securement of an exemplified peripheral die 7 to the core 3. The retaining element 10 is screwed to the core 3 by means of the fastening screw 11 and tightly pressed against the spacer sleeve 8. As the spacer sleeve 8 is slightly greater than the cross section of the peripheral die 7, the peripheral die 7 can moved relative to the core 3. It will be appreciated by persons skilled in the art that the gap 9, depicted in FIG. 2 between confronting surfaces of the peripheral die 7 and the core 3, is not shown in FIG. 4 for sake of simplicity. Unlike in FIG. 3, the piston-cylinder units 13 for the peripheral dies 7 are not precisely positioned in symmetry beneath the peripheral dies, but slightly eccentric. This is of no consequence in view of the massive configuration of the support frame 12.

As further shown in FIG. 4, the core 3 has one or more channels 17 which are fluidly connected to complementary channels 18 of the peripheral dies 7 adjacent the surface confronting the core 3. The channels 18 extend to an area in close proximity of the core 3. After molding a finished product 19, the movable clamping plate 1 is moved away from the female mold member 4, while the peripheral dies 7 are slightly moved beyond the core 3, so that the marginal zone of the molded product 19 slightly bends and the channels 18 are located partially outside the core area. Thus, a gas, preferably clean air, can be injected via the channels 17 and 18 between the molded product and the core 3 to better separate the molded product 19 from the core 3 in the event the molded product 19, for example, a plastic pane, sticks to the core 3 as a consequence of adhesion. It is, however, also possible to apply a vacuum in the channels 17, 18 to ensure that the molded product remains attached to the core side.

While the invention has been illustrated and described as embodied in a molding apparatus, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A molding apparatus; comprising:
   a female mold member;
   a core capable of moving in a closing direction against the female mold member to define a cavity for molding an object, said core being completely surrounded by peripheral dies which are movable in the closing direction against a complementary impact area of the female mold member; and
   fastening means for securing each of the peripheral dies laterally to the core, said fastening means including a retaining element for attaching the peripheral die to the core, and a spacer element fitted in the peripheral die and having a width which slightly exceeds a cross section of the peripheral die to thereby realize a gap between confronting surfaces of the core and the peripheral die.

2. The molding apparatus of claim 1 wherein the gap has a width of less than 0.05 mm.

3. The molding apparatus of claim 1 wherein the gap has a width ranging between 0.01 mm and 0.02 mm.

4. The molding apparatus of claim 1 wherein the spacer element is a sleeve, said retaining element being secured with a fastener to the core, said fastener being surrounded in a space between the retaining element and the core by the spacer element.

5. The molding apparatus of claim 1 wherein the spacer element and the retaining element are configured in one piece in the form of a T shaped sliding block, said peripheral die having a recess for engagement by the sliding block.

6. The molding apparatus of claim 1, and further comprising operating means for moving the peripheral dies relative to the core.

7. The molding apparatus of claim 6 wherein the operating means includes at least one of hydraulic piston-cylinder unit and pneumatic piston-cylinder unit.

8. The molding apparatus of claim 1, and further comprising spring means, positioned at a core-proximal side of the peripheral dies, for biasing the peripheral dies in the direction of the female mold member.

9. The molding apparatus of claim 8 wherein the spring means includes an annular spring.

10. The molding apparatus of claim 1, and further comprising a support frame, encircling the core, for attachment of the peripheral dies.

11. The molding apparatus of claim 10, and further comprising a movable mold clamping plate for attachment of the core, a core plate secured to the movable clamping plate and provided for support of the core; spring means, positioned at a core-proximal side of the peripheral dies, for biasing the peripheral dies in the direction of the female mold member; and operating means for moving the peripheral dies relative to the core, at least one of said operating means and said spring means being mounted between the support frame and the core plate.

12. The molding apparatus of claim 11 wherein the support frame engages behind the core, at least one of the operating means and spring means positioned precisely below the peripheral dies.

13. The molding apparatus of claim 11 wherein the peripheral dies are formed in a region bearing on the core with channels, and the core is formed with complementary channels, with the channels of the peripheral dies extending to an area close to the core so that a movement of the peripheral dies in the closing direction results in a slight elevation of a finished molded plastics part, with gas supplied via the channels.

14. The molding apparatus of claim 1 wherein the female mold member is of flat configuration at least in the area of impact of the peripheral dies.

* * * * *